(12) United States Patent
Noshimoto

(10) Patent No.: US 7,343,608 B2
(45) Date of Patent: Mar. 11, 2008

(54) RECORDING MEDIUM ACCOMMODATION APPARATUS

(75) Inventor: Naohiro Noshimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 305 days.

(21) Appl. No.: 11/191,725

(22) Filed: Jul. 28, 2005

(65) Prior Publication Data

US 2006/0026621 A1 Feb. 2, 2006

(30) Foreign Application Priority Data

Jul. 30, 2004 (JP) ............................. 2004-224021
Sep. 30, 2004 (JP) ............................. 2004-286095

(51) Int. Cl.
*G11B 33/02* (2006.01)
(52) U.S. Cl. ..................................................... 720/647
(58) Field of Classification Search ................ 720/647, 720/658, 646
See application file for complete search history.

(56) References Cited

U.S. PATENT DOCUMENTS

| | | | | |
|---|---|---|---|---|
| 4,560,124 A | * | 12/1985 | Alves et al. ............... | 248/27.1 |
| 5,086,422 A | * | 2/1992 | Hagiya et al. .............. | 720/648 |
| 5,815,468 A | * | 9/1998 | Muramatsu et al. .......... | 369/2 |
| 6,883,759 B2 | * | 4/2005 | Park et al. ................. | 248/27.3 |
| 2002/0005897 A1 | * | 1/2002 | Kim ........................... | 348/148 |
| 2002/0095245 A1 | * | 7/2002 | Kamewada et al. ........... | 701/1 |
| 2003/0103432 A1 | * | 6/2003 | Nishio et al. ............... | 369/75.1 |
| 2004/0024961 A1 | * | 2/2004 | Cochran et al. ............. | 711/112 |

* cited by examiner

*Primary Examiner*—Brian E. Miller
*Assistant Examiner*—Matthew G. Kayrish
(74) *Attorney, Agent, or Firm*—Frommer Lawrence & Haug LLP; William S. Frommer; Thomas F. Presson

(57) ABSTRACT

A storage medium accommodation apparatus is disclosed wherein the range of sliding movement of a panel for opening and closing a plurality of storage medium access ports is reduced. The storage medium accommodation apparatus includes a housing having first and second access ports provided on a principal face thereof, and first and second panels for opening and closing the first and second access ports, respectively. When the first and second access ports are closed up with the first and second panels, the first and second panels contact with each other. In order to expose the second access port, the second panel is slidably moved in a particular direction, but in order to expose the first access port, the second panel and the first panel are slidably moved integrally with each other in the particular direction.

11 Claims, 17 Drawing Sheets

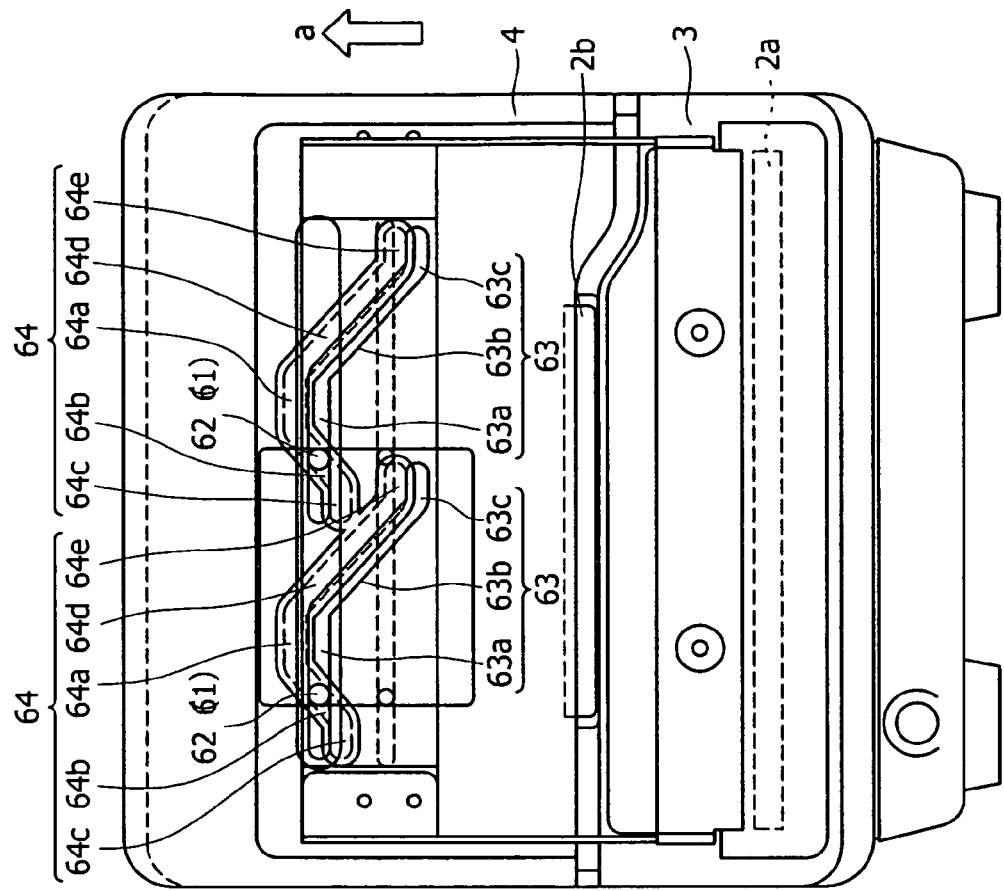
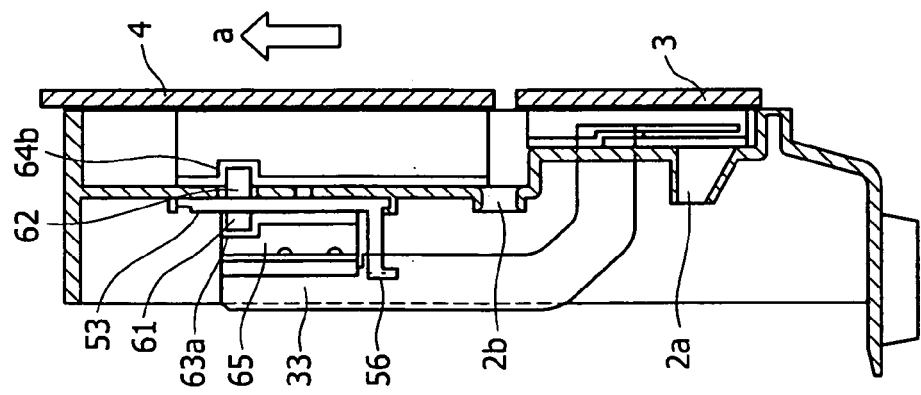

RECORDING MEDIUM ACCOMMODATION APPARATUS

BACKGROUND OF THE INVENTION

This invention relates to a recording medium accommodation apparatus which has at least two recording medium access ports including a first recording medium access port and a second recording medium access port such that a recording medium can be inserted into the storage medium accommodating apparatus through each of the recording medium access ports.

Such a recording medium accommodation apparatus as shown in FIGS. 15 and 16A to 16c is known. Referring to FIGS. 15 and 16A to 16C, the storage medium accommodation apparatus 200 shown has two recording medium access ports including a first storage medium access port 202 and a second storage medium access port 203 on a principal face 201a of a housing 201 thereof. A first recording medium, such as, for example, a CD (Compact Disk) can be accommodated into the storage medium accommodation apparatus 200 through the first storage medium access port 202 while a second recording medium such as, for example, an MD (Mini Disk, magneto-optical disk) is accommodated into the storage medium accommodation apparatus 200 through the second storage medium access port 203 so that the CD or the MD is recorded and/or reproduced.

In the storage medium accommodation apparatus 200, a single panel 204 is attached for sliding movement to the principal face 201a of the housing 201 such that it closes up one of the two first and second storage medium access ports 202 and 203 and opens the other of the two first and second storage medium access ports 202 and 203. The panel 204 is formed with a size substantially equal to that of the principal face 201a of the housing 201.

When none of a CD and an MD is to be accommodated into the storage medium accommodation apparatus 200, the panel 204 closes up both of the first and second storage medium access ports 202 and 203 as seen in FIG. 16A. However, when a CD is to be accommodated into the storage medium accommodation apparatus 200, the panel 204 is slidably moved in the direction indicated by an arrow mark a such that it opens the first storage medium access port 202 while it keeps the state wherein it closes up the second storage medium access port 203 as seen in FIG. 16B. On the other hand, when an MD is to be accommodated into the storage medium accommodation apparatus 200, the panel 204 is slidably moved in the direction indicated by another arrow mark b such that it opens the second storage medium access port 203 while it maintains the state wherein it closes up the first storage medium access port 202 as seen in FIG. 16C. Such a storage medium accommodation apparatus 200 as described above is disclosed, for example, in "Sound Gate Catalog", Sony Corporation, July 2004 (hereinafter referred to as Non-Patent Document 1).

SUMMARY OF THE INVENTION

Incidentally, since the conventional storage medium accommodation apparatus 200 is configured such that it uses the single panel 204 formed in a size substantially equal to that of the principal face 201a of the housing 201 and, in order to open the first storage medium access port 202 and in order to open the second storage medium access port 203, the panel 204 is slidably moved in the opposite directions to each other as indicated by the arrow marks a and b, it has the following problems.

(1) Since the entire panel 204 must be slidably moved not only when the first storage medium access port 202 is to be opened but also when the second storage medium access port 203 is to be opened, high energy is required for the sliding movement, and increased power consumption is required.

(2) Since the panel 204 partially projects from a side face of the housing 201 not only when the panel 204 is slidably moved in the direction indicated by the arrow mark a but also when the panel 204 is slidably moved in the direction indicated by the arrow mark b, a great sliding range H (refer to FIG. 16C) is required. Therefore, a space for assuring the sliding range H is required, which makes a neck to the downsizing of the recording medium accommodation apparatus. Further, the storage medium accommodation apparatus 200 cannot be placed on a table surface T or the like in a state wherein it contacts with a wall face W or the like as indicated by alternate long and two short dashes lines in FIG. 16A.

(3) It is a possible idea to divide the panel 204, as seen in FIGS. 17A to 17C, into a panel 204a for opening and closing the first storage medium access port 202 and another panel 204b for opening and closing the second storage medium access port 203 and slidably move the two panels 204a and 204b in the opposite directions (directions indicated by the arrow marks a and b) to each other so that each of the first and second storage medium access ports 202 and 203 can be opened by itself. Also in this instance, however, any of the panels 204a and 204b projects from the principal face 201a of the housing 201.

There is a need for a storage medium accommodation apparatus wherein a pair of divisional panel parts can be slidably moved in the same direction to open or close first and second storage medium access ports.

There is another need for a storage medium accommodation apparatus by which the degree of freedom in location of a first storage medium access port and a second storage medium access port can be enhanced.

According to an embodiment of the present invention, there is provided a recording medium accommodation apparatus comprising a housing having a first storage medium access port and a second storage medium access port provided on a principal face thereof such that a first storage medium and a second storage medium can be inserted into the housing through the first storage medium access port and the second storage medium access port, respectively, a first panel attached to the principal face of the housing for movement between a first position at which the first panel closes up the first storage medium access port and a second position at which the first panel opens the first storage medium access port, a second panel attached to the principal face of the housing for movement between a first position at which the second panel closes up the second storage medium access port and a second position at which the second panel opens the second storage medium access port, and a panel driving section for moving the first panel and the second panel, the first panel and the second panel being moved in the same direction upon movement thereof from the respective first positions to the respective second positions.

In the storage medium accommodation apparatus, the first panel and the second panel are moved in the same direction to individually open the first storage medium access port and the second storage medium access port. Consequently, such a situation that the two panels individually project from the principal face of the housing as in such a case that the two panels described hereinabove with reference to FIGS. 17A to 17C are slidably moved in the opposite directions to each other to open the first and second storage medium access ports as described hereinabove can be prevented. Accordingly, the storage medium accommodation apparatus can be placed on a table surface or the like while one side face thereof contacts with a wall face or the like. On the other hand, where the storage medium accommodation apparatus is of the horizontally laid type, it can be placed such that one of the storage medium access ports is positioned nearer to a table face or the like.

The storage medium accommodation apparatus may be configured such that, when the first panel and the second panel are positioned at the respective first positions, the first panel and the second panel are positioned closely to each other without a gap left therebetween, but when the second panel moves to the second position while the first panel remains at the first position, a gap of a size equal to the amount of movement of the second panel is produced between the first panel and the second panel, and then when the first panel moves to the second position, the first panel and the second panel are positioned closely to each other without a gap left therebetween.

In the recording medium accommodation apparatus, when the first panel and the second panel are positioned at the respective first positions, that is, when the first and second storage medium access ports are closed up, the two panels are positioned closely to each other without a gap left therebetween such that they have an appearance like a single panel.

Preferably the first panel closes up the second storage medium access port when the first panel moves to the second position.

In the recording medium accommodation apparatus, when the second panel is positioned at the second position, if the first panel is moved to the second position without moving the second panel to the first position, then the first panel opens the first storage medium access port while the second storage medium access port remains closed with the first panel.

Preferably, the first panel moves from the first position to the second position integrally with the second panel.

In the recording medium accommodation apparatus, the action of opening the first storage medium access port from a state wherein the first and second storage medium access ports are closed up can be performed efficiently by moving the first panel and the second panel simultaneously.

The storage medium accommodation apparatus may further include recording and/or reproduction apparatus for performing recording and/or reproduction of the first storage medium and the second storage medium inserted through the first storage medium access port and the second storage medium access port, respectively.

In the recording medium accommodation apparatus, recording and/or reproduction of a first storage medium and a second storage medium inserted into the housing through the first storage medium access port and the second storage medium access port can be performed by the recording and/or reproduction apparatus built in the housing.

The first storage medium access port is provided at a lower portion of the principal face of the housing, and the second storage medium access port may be provided at a central portion of the principal face of the housing.

In the storage medium accommodation apparatus, since the first storage medium access port is provided at a lower portion of the principal face of the housing, when the first storage medium is taken out from the first storage medium access port, even if the first storage medium drops in error, the damage to the first storage medium can be suppressed to the minimum.

The storage medium accommodation apparatus may be configured such that, when the first panel is positioned at the first position, the first panel covers a lower half portion of the principal face of the housing from an edge portion of the first storage medium access port to an edge portion of the second storage medium access port, and when the second panel is positioned at the first position, the second panel covers an upper half portion of the principal face of the housing from an edge portion of the second storage medium access port to an edge portion of the principal face of the housing.

In the storage medium accommodation apparatus, the first or second storage medium access port can be opened or closed by moving the first panel and/or the second panel by a distance equal to the thickness of the first or second storage medium access port.

Preferably, wherein at least one of the first panel and the second panel has a display section and an operation unit provided thereon.

In the storage medium accommodation apparatus, the display section and the operation unit provided on the first panel and/or the second panel can be utilized to display various information or perform various key operations.

The panel driving section may include a motor, a slider for being moved back and forth by the motor, and a cam mechanism for moving the slider in one direction from a neutral position to move the second panel from the first position to the second position, moving the slider back to the original neutral position to move the second panel from the second position back to the first position, moving the slider in the other direction from the neutral position to move the first panel and the second panel from the respective first positions to the respective second positions, and moving the slider back to the original neutral position to move the first panel and the second panel from the respective second positions back to the respective first positions.

In the storage medium accommodation apparatus, if the slider is moved to the neutral position by the motor, then the first panel and the second panel are positioned at the respective first positions and hence close up the first storage medium access port and the second storage medium access port, respectively. Then, if the slider is moved in one direction from the neutral position by the motor, then the second panel is moved from the first position to the second position to open the second storage medium access port. Then, if the slider is moved back to the original neutral position, then the second panel is moved from the second position to the first position to close up the second storage medium access port again. Further, if the slide is moved in the other direction from the neutral position, then the first panel and the second panel are moved from the respective first positions to the respective second positions to open the first storage medium access port. Thereafter, if the slider is moved back to the original neutral position, then the first panel and the second panel are moved from the respective second positions to the respective first positions to close up the first storage medium access port.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 6A and 6B are a front elevational view and a side elevational view, respectively, showing a positional relationship between the cam projections and the cam grooves while the second panel moves from the first position to a second position;

DETAILED DESCRIPTION OF THE PREFERRED EMBODIMENTS

In the following, storage medium accommodation apparatus of the present invention are described in the order of (1) general configuration of the entire apparatus, (2) configuration of the housing, (3) configuration of the first and second panels, (4) configuration of the panel driving mechanism, (5) configuration of the recording and/or reproduction apparatus, (6) action, and (7) other embodiments.

(1) General Configuration of the Entire Apparatus

Figure 1A:
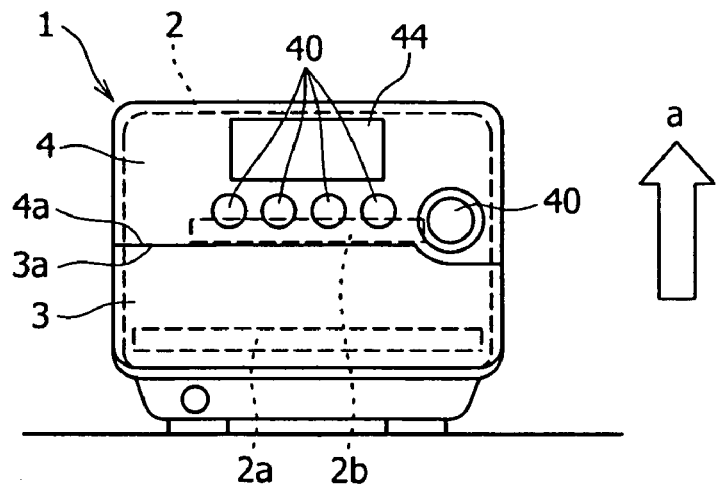
FIGS. 1A, 1B and 1C are front elevational views of a storage medium accommodation apparatus to which the present invention is applied where first and second recording medium access ports are closed up, the second recording medium access port is open and the first recording medium access port is open, respectively.
Figure 1B:
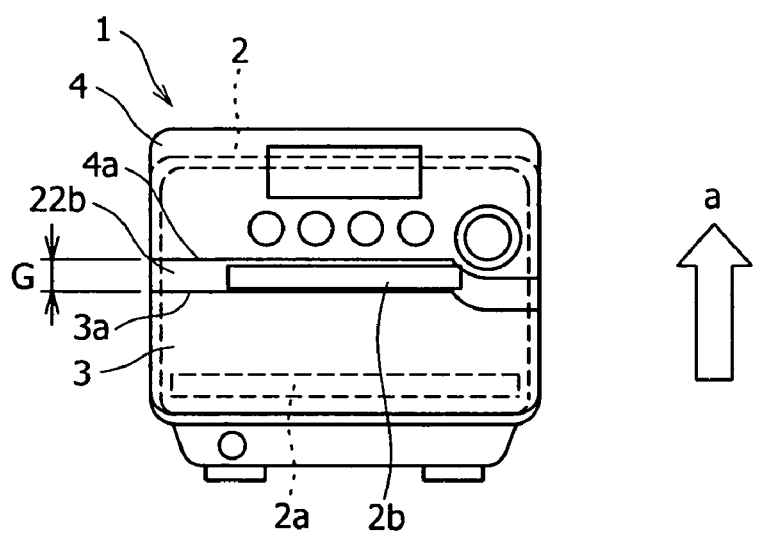
Figure 1C:
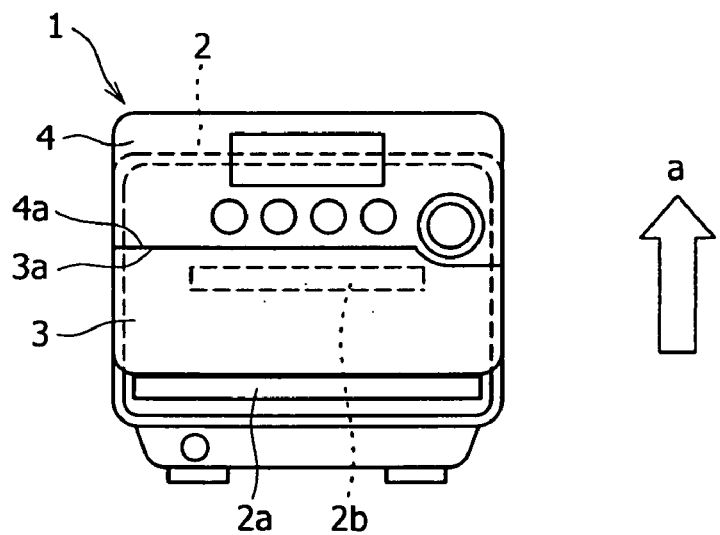

Referring to FIGS. 1A to 1C, there is shown a storage medium accommodation apparatus to which the present invention is applied. In particular, FIG. 1A is a front elevational view where a first storage medium access port $2a$ and a second storage medium access port $2b$ are closed up; FIG. 1B is a front elevational view where the second storage medium access port $2b$ is open; and FIG. 1C is a front elevational view where the first storage medium access port $2a$ is open. The storage medium accommodation apparatus 1 includes a housing 2 having the first storage medium access port $2a$ and the second storage medium access port $2b$ on a principal face $22b$ thereof, and a first panel 3 attached to the principal face $22b$ of the housing 2 for movement between a first position (refer to FIGS. 1A and 1B) at which it closes up the first storage medium access port $2a$ and a second position (refer to FIG. 1C) at which it opens the first storage medium access port $2a$. The storage medium accommodation apparatus 1 further includes a second panel 4 attached to the principal face $22b$ of the housing 2 for movement between a first position (refer to FIG. 1A) at which it closes up the second storage medium access port $2b$ and a second position (refer to FIG. 1B) at which it opens the second storage medium access port $2b$. The storage medium accommodation apparatus 1 further includes a panel driving mechanism 5 (refer to FIG. 2 and so forth) for driving the first panel 3 and the second panel 4 to move between the respective first and second position. The direction of movement (direction of an arrow mark a) of the first panel 3 from the first position to the second position and the direction of movement (direction of the arrow mark a) of the second panel 4 from the first position to the second position are same as each other.

As seen in FIG. 1A, when the first panel 3 and the second panel 4 are positioned at the respective first positions, that is, when the first panel 3 and the second panel 4 close up the first storage medium access port $2a$ and the second storage medium access port $2b$, respectively, side portions $3a$ and $4a$ of the first and second panels 3 and 4 are positioned closely to each other without a gap left therebetween.

As seen in FIG. 1B, when the first panel 3 is positioned at the first position and the second panel 4 is positioned at the second position, the side portions $3a$ and $4a$ of the first and second panels 3 and 4 are spaced from each other with a gap G left therebetween which corresponds to the amount of movement of the second panel 4.

As seen in FIG. 1C, when the second panel 4 is positioned at the second position and the first panel 3 is positioned at the second position, the side portions 3a and 4a of the first and second panels 3 and 4 are positioned closely to each other without a gap left therebetween.

Thus, if, while the first storage medium access port 2a and the second storage medium access port 2b are closed up with the first panel 3 and the second panel 4, respectively, as seen in FIG. 1A, only the second panel 4 is moved in a particular direction (direction indicated by the arrow mark a) to the second position, then the second storage medium access port 2b is opened as seen in FIG. 1B. On the other hand, if, while the first storage medium access port 2a and the second storage medium access port 2b are closed up with the first panel 3 and the second panel 4, respectively, as seen in FIG. 1A, the first panel 3 and the second panel 4 are moved simultaneously in the particular direction (direction indicated by the arrow mark a) to the second position, then the first storage medium access port 2a is opened as seen in FIG. 1C.

(2) Configuration of the Housing

Figure 2:
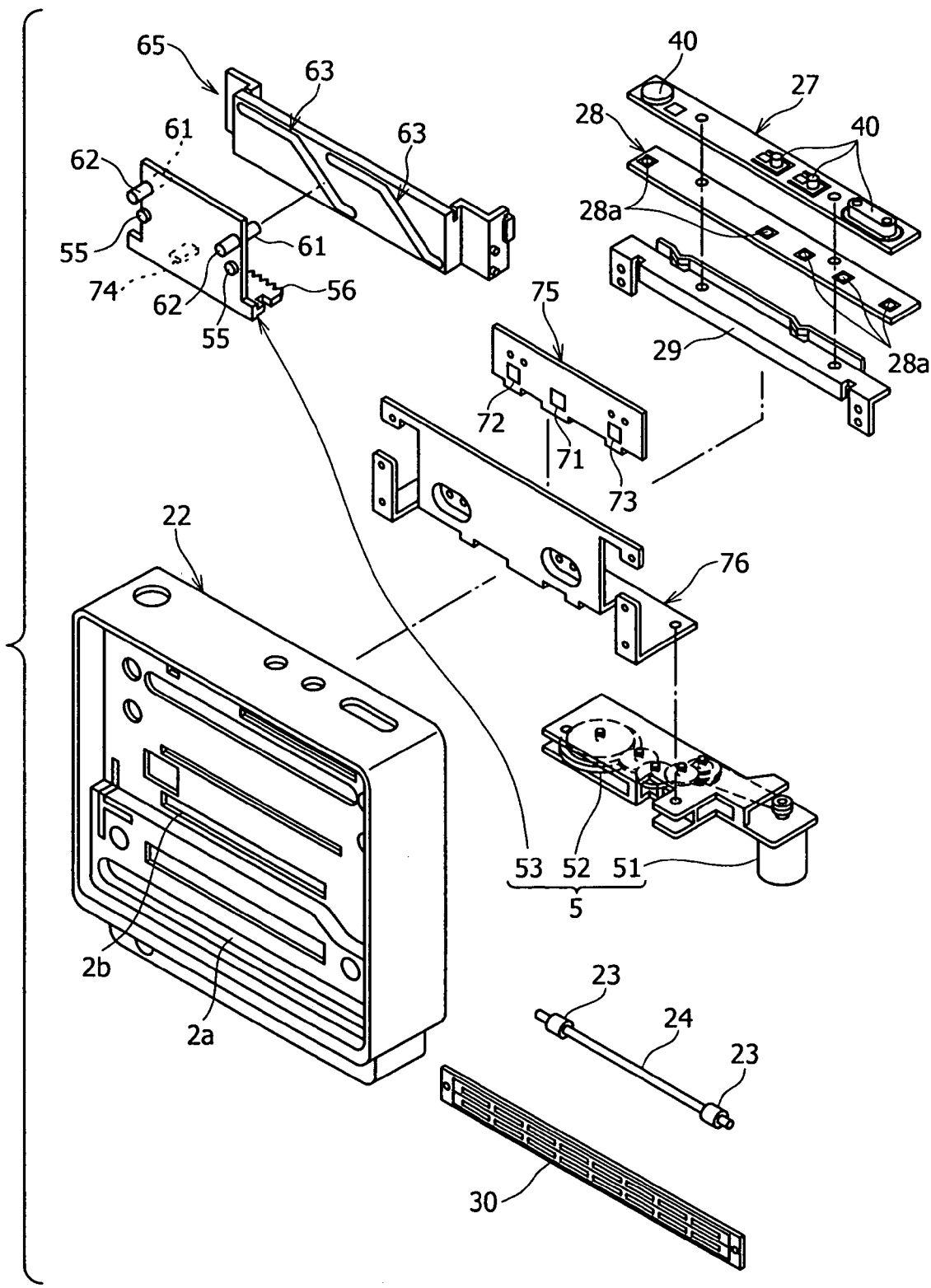
FIG. 2 is an exploded perspective view of a housing of the storage medium accommodation apparatus.
Figure 3:
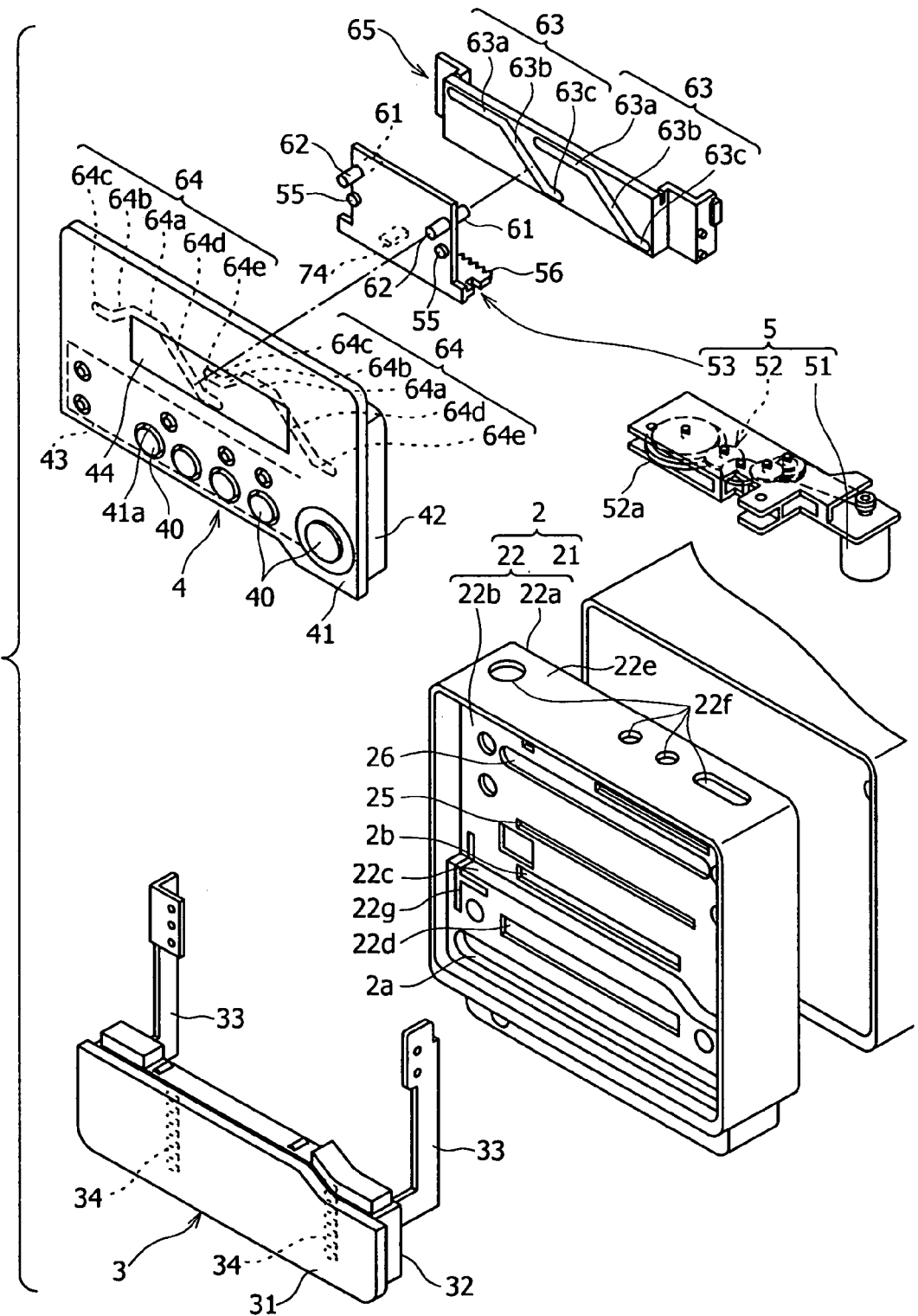
FIG. 3 is an exploded perspective view of a cam mechanism of the storage medium accommodation apparatus.

FIG. 2 is an exploded perspective view of the storage medium accommodation apparatus 1 and FIG. 3 is a perspective view of a cam mechanism. Referring to FIGS. 2 and 3, the housing 2 includes a housing body part 21, and a front part 22 attached to the front face side of the housing body part 21. The front part 22 includes a quadrangular framework member 22a, and a principal face part 22b provided on the inner periphery side of the framework member 22a. The first panel 3 and the second panel 4 described above are assembled to the front face side of the principal face part 22b, and the panel driving mechanism 5 is assembled to the rear face side (housing body part 21 side) of the principal face part 22b.

The principal face part 22b has a stepped portion 22c at a substantially central portion thereof in the heightwise direction, and the first panel 3 is assembled for movement in the upward and downward directions at a portion of the principal face part 22b below the stepped portion 22c while the second panel 4 is assembled for movement in the upward and downward directions at another portion of the principal face part 22b above the stepped portion 22c. The first storage medium access port 2a is provided at a lower end portion of the principal face part 22b while the second storage medium access port 2b is provided a little above the stepped portion 22c.

The principal face part 22b has an elongated hole 22d for attachment of a shaft provided at a position adjacent the upper end thereof below the stepped portion 22c but above the first storage medium access port 2a. A shaft 24 is attached to the elongated hole 22d and has a pair of pinion gears 23 attached to the opposite ends thereof in the lengthwise direction. The pinion gears 23 are held in meshing engagement with a pair of racks 34 provided on the rear face of the first panel 3 hereinafter described in detail in such a manner as to allow the first panel 3 to move smoothly and prevent the first panel 3 from being inclined.

Further, the principal face part 22b has an elongated hole 25 for a slide guide provided above the second storage medium access port 2b such that slide guide projections 55 provided on one side face of a slider 53 of the panel driving mechanism 5 hereinafter described are inserted in the elongated hole 25. The principal face part 22b further has an elongated hole 26 for a cam provided above the elongated hole 25 such that a pair of second cam projections 62 provided on the one side face of the slider 53 of the panel driving mechanism are inserted in the elongated hole 26. The second cam projections 62 provided on the slider 53 are individually inserted in a pair of second cam grooves 64 provided on the rear face of the second panel 4 through the elongated hole 26 for a cam.

A plurality of key holes 22f are provided on a top plate 22e of the quadrangular framework member 22a. A sheet key 27 is attached to the inner face of the top plate 22e, and a plurality of keys 40 provided on the sheet key 27 individually project from the key holes 22f. A switch board 28 has a plurality of tact switches 28a and so forth provided thereon and is attached to a lower portion of the sheet key 27 by an attaching member 29 such that, when any of the keys 40 is depressed, a tact switch 28a or the like can be operated. It is to be noted that a cover sheet 30 is attached to the inner side of the first storage medium access port 2a.

(3) Configuration of the First and Second Panels

Referring to FIGS. 2 and 3, the first panel 3 includes a panel body part 31 formed in a shape of a plate from a synthetic resin material, a fitting portion 32 provided on the rear face of the panel body part 31 for fitting with the front part 22, and a pair of arm portions 33 provided on the opposite side portions of the rear face of the fitting portion 32.

The arm portions 33 extend through slits 22g provided on the opposite side portions of the principal face part 22b of the front part 22 toward the rear face side of the principal face part 22b. The fitting portion 32 is fitted at a position in the framework member 22a of the front part 22 lower than the stepped portion 22c. The panel body part 31 contacts at the inner face of peripheral edge portions thereof with the end face of the framework member 22a and projects to the outer side of the framework member 22a. The first panel 3 is assembled in the framework member 22a for movement between the first position at which it closes up the first storage medium access port 2a and the second position at which it opens the first storage medium access port 2a.

The second panel 4 includes a panel body part 41 formed in the shape of a plate from a transparent synthetic resin material, and a fitting portion 42 provided on the rear face of the panel body part 41 for fitting with the front part 22.

The panel body part 41 has a large number of key holes 41a formed therein, and various keys 40 are attached to the key holes 41a. A printed board 43 is assembled in the fitting portion 42, and operated elements such as tact switches for being operated by the keys 40 are provided on the printed board 43. Further, a display section 44 such as a liquid crystal display unit or the like is assembled in the fitting portion 42. The fitting portion 42 is inserted at a portion in the framework member 22a of the front part 22 above the stepped portion 22c. The panel body part 41 contacts with an end face of the framework member 22a and projects to the outer side of the framework member 22a. The second panel 4 is assembled in the framework member 22a for movement between the first position at which it closes up the second storage medium access port 2b and the second position at which it opens the second storage medium access port 2b.

Each of the first panel 3 and the second panel 4 is moved between the first position at which it closes up the storage medium access port and the second position at which it opens the storage medium access port by the panel driving mechanism 5 described below.

(4) Configuration of the Panel Driving Mechanism

Figure 4:
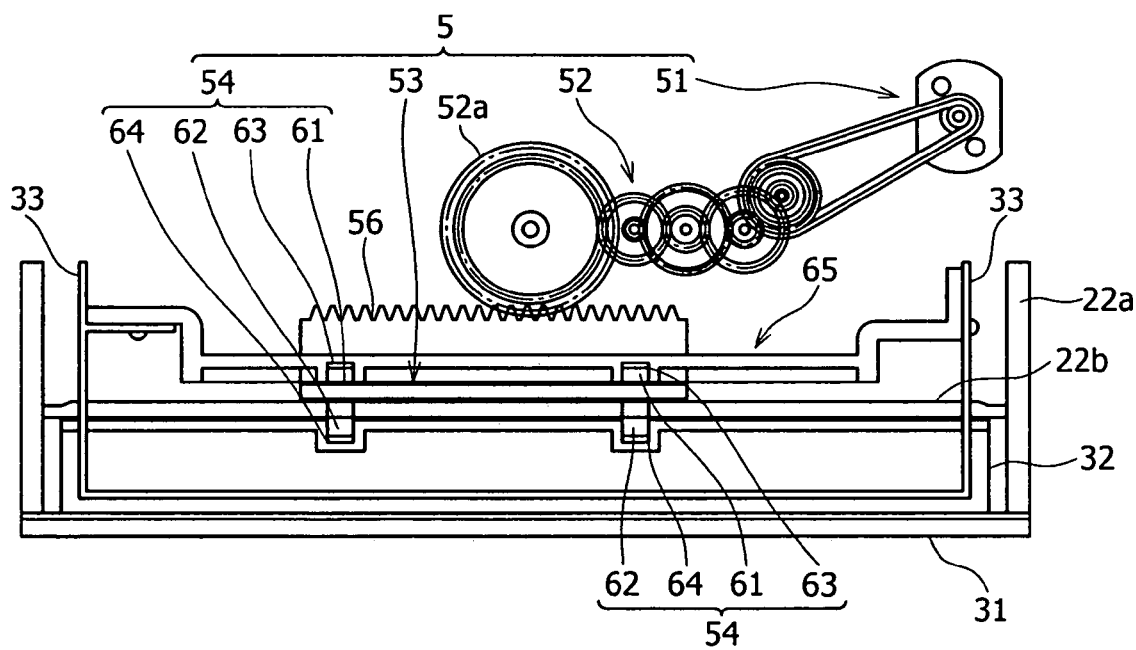
FIG. 4 is a plan view of a slider driving mechanism of the storage medium accommodation apparatus.

Referring to FIGS. 2 to 4, the panel driving mechanism 5 includes a reversible motor 51 whose direction of rotation can be changed, a rotation transmission mechanism 52 for transmitting the rotation of the motor 51, and a slider 53 for being slidably moved by the motor 51 through the rotation transmission mechanism 52. The panel driving mechanism 5 further includes a cam mechanism 54 for moving the first panel 3 and the second panel 4 between the respective first and second positions in response to the movement of the slider 53.

The slider 53 is attached for sliding movement on the rear face side of the principal face part 22b while the slide guide projections 55 are inserted in the elongated hole 25 for a slide guide provided on the principal face part 22b of the front part 22. A rack 56 is provided at a lower end of the slider 53 and is held in meshing engagement with a pinion gear 52a at a terminal end of the rotation transmission mechanism 52.

The cam mechanism 54 for moving the first panel 3 and the second panel 4 between the first and second positions in response to the movement of the slider 53 includes a pair of first cam projections 61 provided on one side face of the slider 53 and a pair of second cam projections 62 provided on the other side face of the slider 53. The cam mechanism 54 further includes a pair of first cam grooves 63 provided on the side thereof adjacent the first panel 3 for individually receiving end portions of the first cam projections 61, and a pair of second cam grooves 64 provided on the second panel 4 for individually receiving end portions of the second cam projections 62.

The first cam grooves 63 are formed on the front face of a cam groove forming plate 65 attached between the pair of arm portions 33 of the first panel 3. Meanwhile, the second cam grooves 64 are formed on the rear face of the fitting portion 42 of the second panel 4, and the second cam projections 62 are individually inserted at end portions thereof in the second cam grooves 64 through the elongated hole 26 for a cam provided on the principal face part 22b.

Each of the first cam grooves 63 has a first groove portion 63a extending in parallel to the direction of movement of the slider 53, a second groove portion 63b extending in an inclined relationship by an angle of approximately 45° with respect to the direction of movement of the slider 53 from one end portion of the first groove portion 63a, and a third groove portion 63c extending in parallel to the direction of movement of the slider 53 from a lower end portion of the second groove portion 63b.

Meanwhile, each of the second cam grooves 64 has a first groove portion 64a extending in parallel to the direction of movement of the slider 53 similarly to the first groove portion 63a of the first cam grooves 63, and a second groove portion 64b extending in an inclined relationship by an angle of approximately 45° with respect to the direction of movement of the slider 53 from one end portion of the first groove portion 64a toward the first groove portion 63a of the first cam groove 63. Each of the second cam grooves 64 further has a third groove portion 64c extending in parallel to the direction of movement of the slider 53 from a lower end portion of the second groove portion 64b, a fourth groove portion 64d extending in an inclined relationship by approximately 45° with respect to the direction of movement of the slider 53 from the other end portion of the first groove portion 64a toward the second groove portion 63b of the first cam groove 63, and a fifth groove portion 64e extending in parallel to the direction of movement of the slider 53 from a lower end of the fourth groove portion 64d similarly to the third groove portion 63c of the first cam groove 63.

Figure 5A:
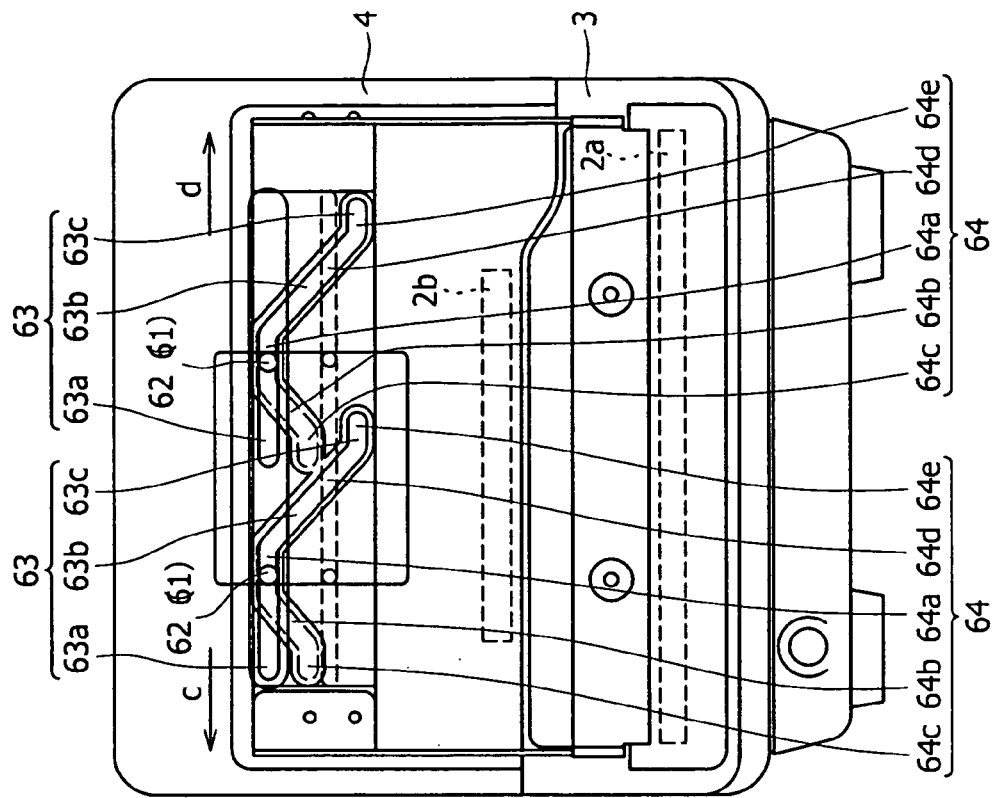
FIGS. 5A and 5B are a front elevational view and a side elevational view, respectively, showing a positional relationship between cam projections and cam grooves of the cam mechanism when first and second panels are positioned at respective first positions.
Figure 5B:
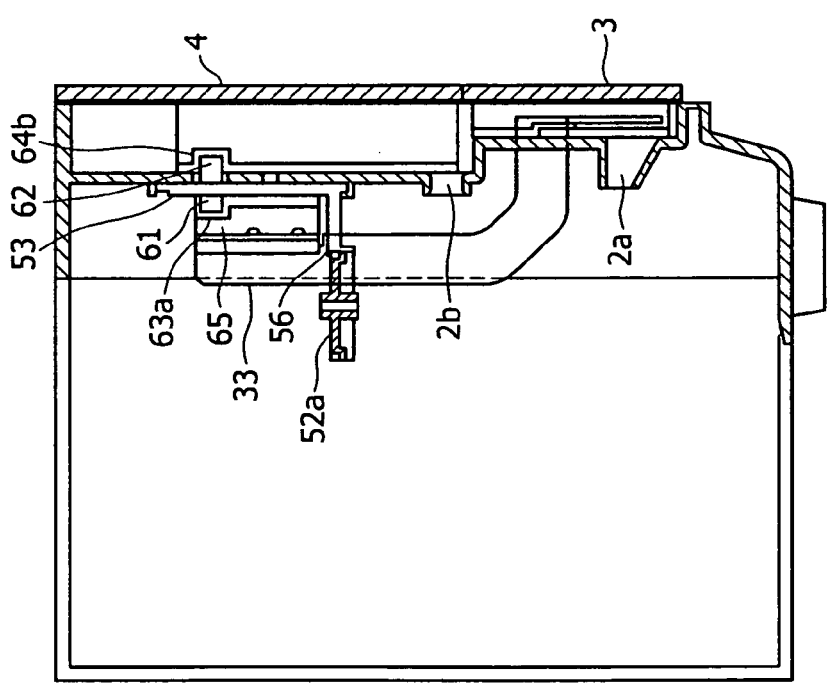

When the first cam projections 61 are positioned at end portions of the first groove portions 63a of the first cam grooves 63 adjacent the second groove portions 63b and the second cam projections 62 are positioned at central portions of the first groove portions 64a of the second cam grooves 64 as seen in FIGS. 5A and 5B, the first panel 3 and the second panel 4 are positioned at the respective first positions and close up the first storage medium access port 2a and the second storage medium access port 2b, respectively.

Figure 7A:
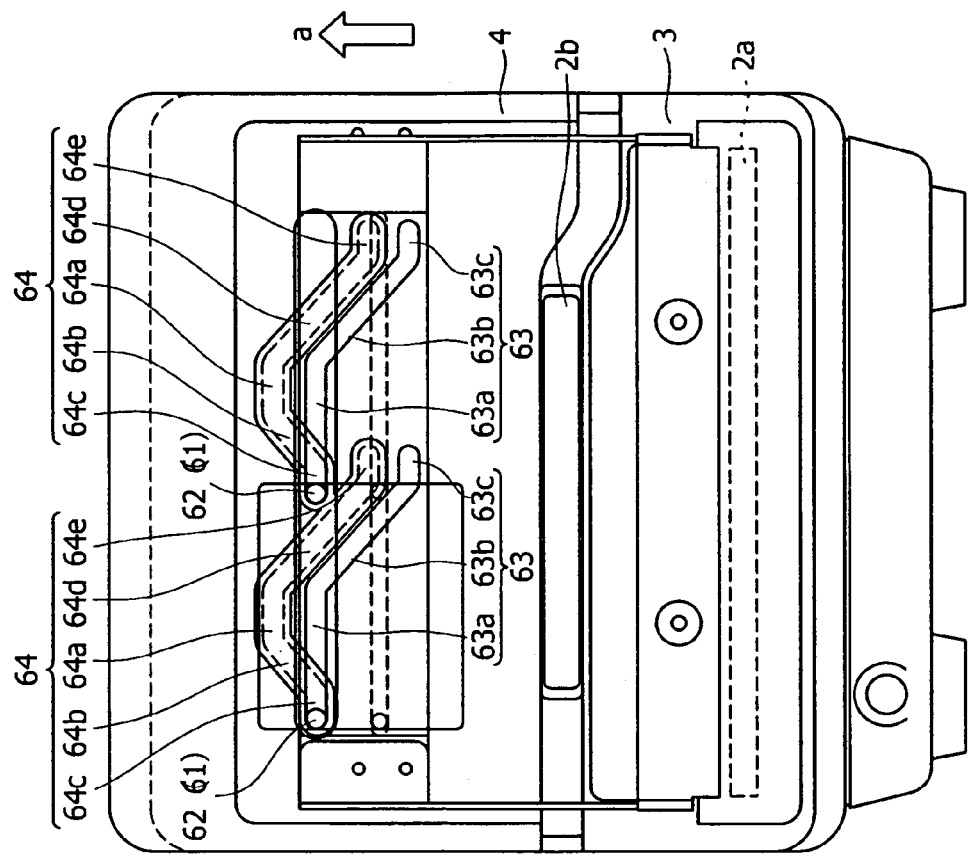
FIGS. 7A and 7B are a front elevational view and a side elevational view, respectively, showing a positional relationship between the cam projection and the cam groove after the second panel moves to the second position.
Figure 7B:
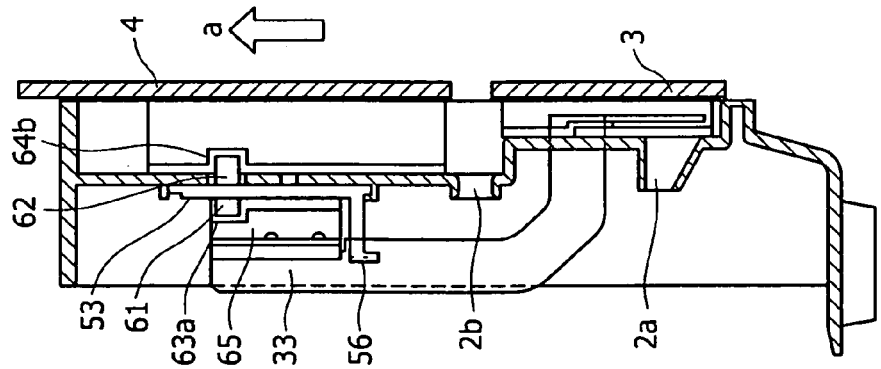
Figure 8A:
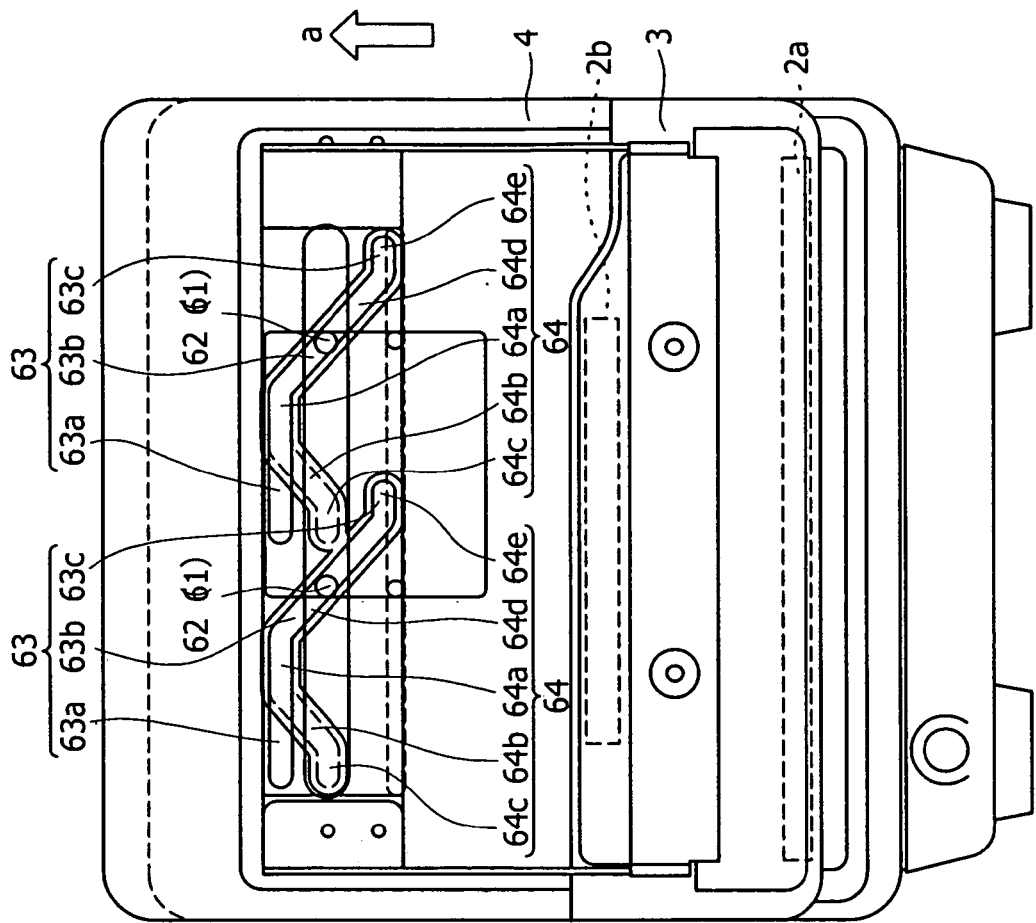
FIGS. 8A and 8B are a front elevational view and a side elevational view, respectively, showing a positional relationship between the cam projections and the cam grooves while the first and second panels move together from the respective first positions to the respective second positions.
Figure 8B:
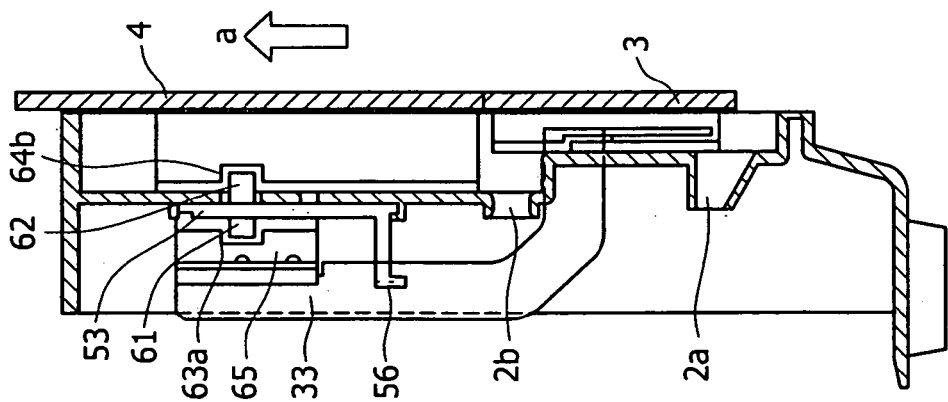

If the slider 53 is moved in the direction indicated by an arrow mark c (leftward direction in FIG. 5A) in the state illustrated in FIGS. 5A and 5B, then the second cam projections 62 are introduced into the second groove portions 64b of the second cam grooves 64 and brought into contact with upper side portions of the second groove portions 64b to move the second panel 4 in the direction indicated by the arrow mark a. At this time, since the first cam projections 61 move in the first groove portions 63a of the first cam grooves 63 extending in parallel to the direction of movement of the slider 53, the second panel 4 does not move in the direction indicated by the arrow mark a. Then, when the second cam projections 62 move into the third groove portions 64c of the second cam grooves 64 as seen in FIGS. 7A and 7B, the second panel 4 is moved from the first position to the second position to fully open the second storage medium access port 2b.

Figure 9A:
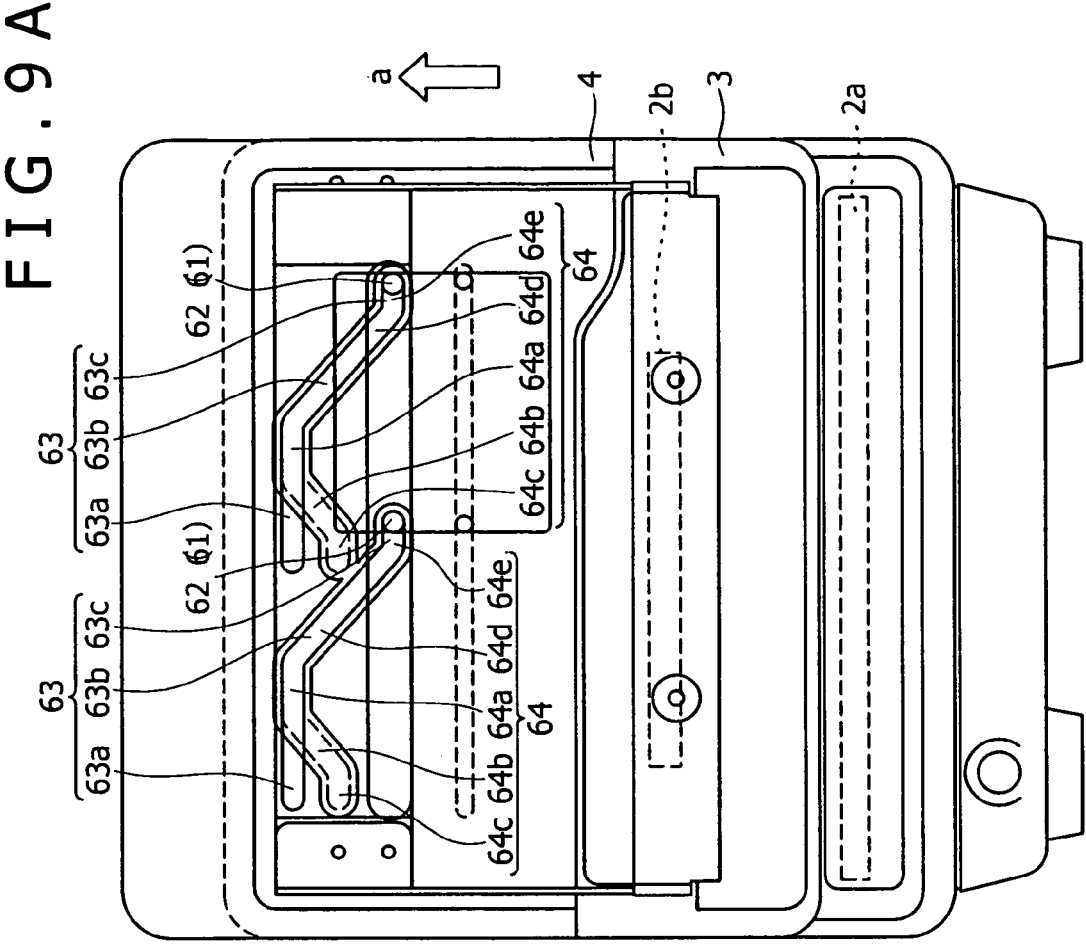
FIGS. 9A and 9B are a front elevational view and a side elevational view, respectively, showing a positional relationship between the cam projections and the cam grooves after the first and second panels move to the respective second positions.
Figure 9B:
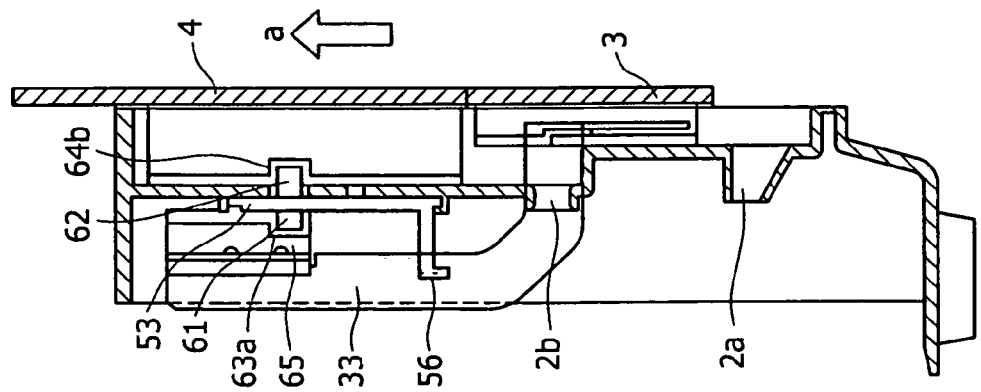
Figure 10:
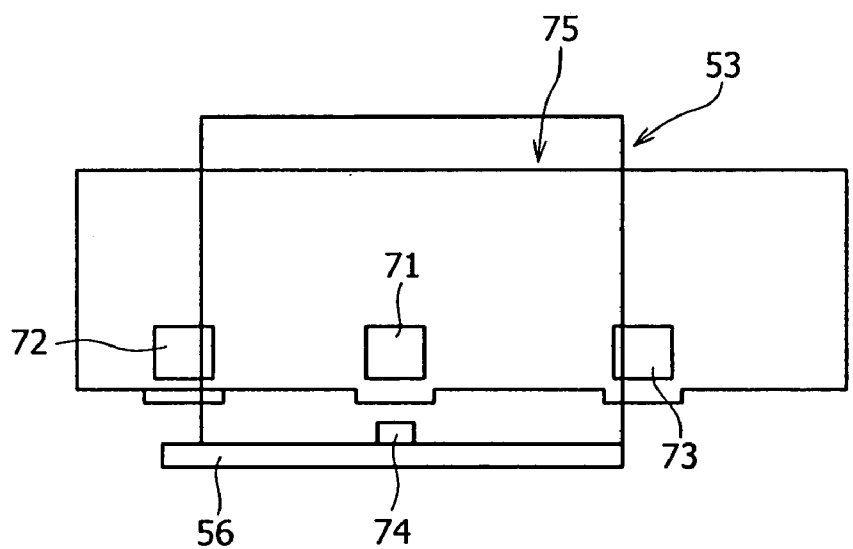
FIG. 10 is a plan view illustrating position detection of the slider by a position detection sensor.

On the other hand, if the motor 51 is rotated reversely to move the slider 53 in the direction indicated by an arrow mark d (rightward direction in FIG. 5A) in the state illustrated in FIGS. 5A and 5B, then the first cam projections 61 are introduced into the second groove portions 63b of the first cam grooves 63 and brought into contact with upper side portions of the second groove portions 63b to move the first panel 3 in the direction indicated by the arrow mark a. Then the second cam projections 62 are brought into the fourth groove portions 64d of the second cam grooves 64 and brought into contact with upper side portions of the fourth groove portions 64d to move the second panel 4 and the first panel 3 in the direction indicated by the arrow mark a. Then, when the first cam projections 61 move into the third groove portions 63c of the first cam grooves 63 and the second cam projections 62 move into the fifth groove portions 64e of the second cam grooves 64, the first panel 3 and the second panel 4 are moved from the respective first positions to the respective second position to fully open the second storage medium access port 2b as seen in FIGS. 9A and 9B. It is to be noted that a detection object portion 74 of the slider 53 is detected by one of first to third slider position detection sensors 71 to 73 shown in FIGS. 2 and 10 to check whether the first and second panels 3 and 4 are at a closing up position or an opening position of the first and second storage medium access ports 2a and 2b, respectively. The first to third slider position detection sensors 71 to 73 are provided on a board 75. The board 75 is attached in the housing by means of a board holder 76.

(5) Configuration of the Recording and/or Reproduction Apparatus

Figure 11:
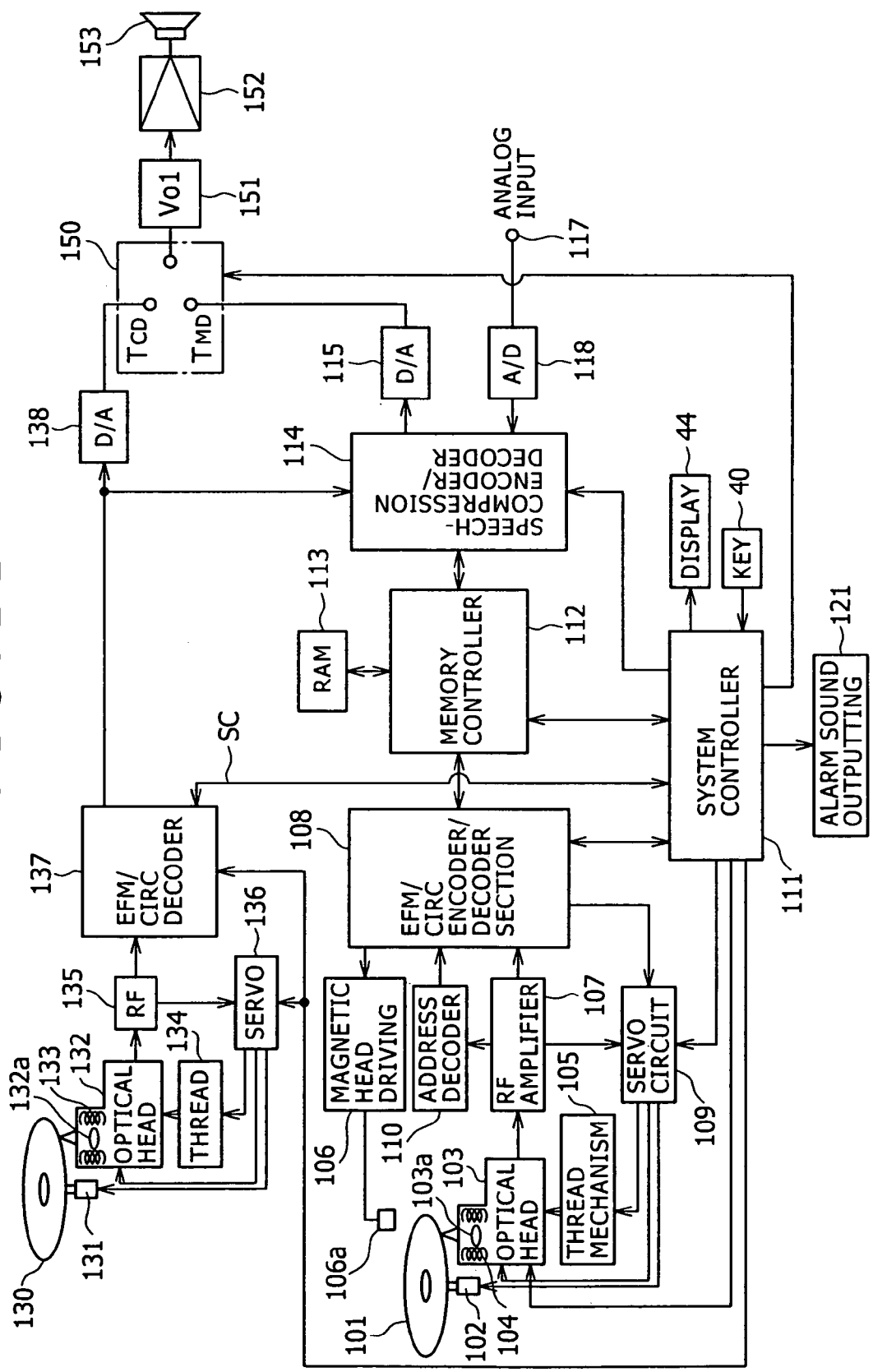
FIG. 11 is a block diagram of a recording and/or reproduction apparatus.

FIG. 11 shows in block diagram a recording and/or reproduction apparatus which performs recording and/or reproduction of a CD or an MD. An MD (magneto-optical disk) 101 is used as a medium on which audio data can be recorded and is driven to rotate by a spindle motor 102 upon recording/reproduction. An optical head 103 irradiates a laser beam upon the MD 101 upon recording/reproduction to operate as a head upon recording/reproduction. In particular, upon recording, the optical head 103 outputs a laser beam of a high power level for heating a recording track up to its Curie temperature, but upon reproduction, the optical head 103 outputs a laser beam of a comparatively low power level for detecting data from reflected light by a magnetic Kerr effect.

To this end, the optical head 103 carries thereon an optical system including a laser diode serving as a laser beam outputting section, a polarizing beam splitter, an objective lens 103a and so forth, and a detector for detecting reflected light. The objective lens 103a is supported for displacement in a disk radial direction and another direction in which the objective lens 103a moves toward and away from the disk by a two-axis mechanism 104, and the entire optical head 103 is supported for sliding movement in the disk radial direction by a thread mechanism 105. Meanwhile, a magnetic head 106a is disposed at a position opposing to the optical head 103 with the MD 101 interposed therebetween. The magnetic head 106a applies to the MD 101 a magnetic field modulated with data supplied thereto. The magnetic head 106a is mounted for sliding movement in the disk radial direction by the thread mechanism 105 together with the optical head 103.

Information detected from the MD 101 by the optical head 103 through reproduction is supplied to an RF amplifier 107. The RF amplifier 107 performs a calculation process on the information supplied thereto to extract a reproduction RF signal, a tracking error signal, a focusing error signal, groove information (absolute position information recorded as pre-grooves (wobbling groove) on the MD 101) and so forth. Then, the extracted reproduction RF signal is supplied to an encoder/decoder section 108. Meanwhile, the tracking error signal and the focusing error signal are supplied to a servo circuit 109. The groove information is supplied to and demodulated by an address decoder 110. The address information decoded from the groove information and address information recorded as data and decoded by the encoder/decoder section 108 are supplied to a system controller 111 which is formed from a microcomputer.

The servo circuit 109 generates various servo driving signals from the tracking error signal and the focusing error signal supplied from the servo circuit 109 and a track jumping instruction, an accessing instruction, rotational speed detection information and so forth from the system controller 111. The servo circuit 109 controls the two-axis mechanism 104 and the thread mechanism 105 to perform focusing and tracking control, and controls the spindle motor 102 to rotate at a constant linear velocity (CLV).

The reproduction RF signal undergoes such a decoding process as EFM demodulation, CIRC or the like by the encoder/decoder section 108 and written once into a buffer memory 113 by a memory controller 112. It is to be noted that reading of data from the MD 101 by the optical head 103 and transfer of reproduction data from the optical head 103 to the buffer memory 113 is performed at the rate of 1.41 Mbit/sec.

The data written in the buffer memory 113 are read out at a timing at which transfer of reproduction data is performed at the rate of 0.3 Mbit/sec and are supplied to an encoder/decoder section 114. Then, a reproduction signal process such as a decoding process for audio-compressed data by a modified DCT process is performed for the data, and then, resulting data are converted into an analog signal by a D/A converter 115. The analog audio signal from the D/A converter 115 is supplied to a $T_{MD}$ terminal of an output switch 150.

Upon reproduction of the MD 101, the system controller 111 controls the output switch 150 to be connected to the $T_{MD}$ terminal so that a reproduction audio signal from the MD 101 is supplied through a sound volume adjustment circuit 151 and an amplification circuit 152 to a speaker 153, by which it is outputted as sound.

Upon recording on the MD 101 by analog transmission, an audio signal from an external apparatus such as a microphone, a CD player, a tape player or a mini disk player is supplied to a terminal 117. The recording signal (analog audio signal) supplied to the terminal 117 is converted into digital data sampled with a frequency of 44.1 KHz and quantized with 16 bits by an A/D converter 118, and is then supplied to the encoder/decoder section 114, by which a audio compression encoding process is performed for the digital data. In particular, the data are compressed to reduce the data amount to approximately ⅕ by a modified DCT process.

The recording data compressed by the encoder/decoder section 114 are written once into the buffer memory 113 by the memory controller 112 and then read out at a predetermined timing from the buffer memory 113 and sent to the encoder/decoder section 108. Then, the recording data are subject to an encoding process such as a CIRC encoding process or an EFM modulation process by the encoder/decoder section 108 and are then supplied to a magnetic head driving circuit 106.

The magnetic head driving circuit 106 supplies a magnetic head driving signal to the magnetic head 106a in response to the recorded data encoded by the encoder/decoder section 108. In particular, the magnetic head driving circuit 106 drives the magnetic head 106a to apply a magnetic field of the N or S polarity to the MD 101. At this time, the system controller 111 supplies a control signal to the optical head 103 so that the optical head 103 outputs a laser beam of the recording level.

A CD (Compact Disk) 130 is driven, upon CD reproduction, to rotate at a constant linear velocity (CLV) by a spindle motor 131. Then, data recorded in the form of pits on the CD 130 are read out by an optical head 132 and supplied to an RF amplifier 135. An objective lens 132a of the optical head 132 is supported by a two-axis mechanism 133 so that it can be displaced in a tracking direction and a focusing direction. Further, the optical head 132 is supported for sliding movement in a radial direction by a thread mechanism 134.

The RF amplifier 135 produces, in addition to a reproduction RF signal, a focusing error signal and a tracking error signal, which are supplied to a servo circuit 136. The servo circuit 136 produces various driving signals including a focusing driving signal, a tracking driving signal, a thread driving signal and a spindle driving signal from the focusing error signal and the tracking error signal and controls the two-axis mechanism 133, thread mechanism 134 and spindle motor 131 with the driving signals.

The reproduction RF signal is supplied to a decoder 137. The decoder 137 performs, EFM demodulation, CIRC decoding and so forth to decode the information read from the CD 130 into digital audio data quantized with 16 bits and sampled at a sampling rate of 44.1 KHz. Further, the decoder 137 extracts control data SC such as TOC data and sub codes and supplies them to the system controller 111 so that they are utilized for various controls.

The digital audio data outputted from the decoder 137 are converted into an analog audio signal by a D/A converter 138 and supplied to a TCD terminal of the output switch 150. In CD reproduction, since the TCD terminal of the output switch 150 is selected by the system controller 111, the reproduction audio signal from the CD 130 is supplied through the sound volume adjustment circuit 151 and the amplification circuit 152 to the speaker 153, from which sound is outputted.

Further, the output of the decoder 137 is supplied also to the encoder/decoder section 114. Consequently, reproduction of the CD 130 and recording of the MD 101 can be performed simultaneously to dubbing record the reproduction audio data from the CD 130 on the MD 101.

An operation section 119 includes various keys 40 such as a recording key, a reproduction key, a stop key, an AMS key and a search key in order to perform various actions for reproduction of a CD and recording/reproduction of an MD. Further, in the present embodiment, a one-tune dubbing operation unit for dubbing one tune hereinafter described is provided. The system controller 111 executes controlling actions of various components in response to operation information from the operation section 119 and an operation program stored in an internal ROM so that MD reproduction, MD recording, CD reproduction or the like is executed. Further, the display section 44 displays, when action for the MD 101 or the CD 130 is performed, various kinds of information, for example, time information such as total play time or progress time upon reproduction or recording, a track number, a state of operation and an operation mode.

An alarm sound outputting section 121 generates electronic sound (alarm sound) under the control of the system controller 111. The electronic sound signal to be generated may be outputted as sound from a speaker provided for the exclusive use or may be supplied to the amplification circuit 152 so that it is outputted as sound from the speaker 153.

Incidentally, upon recording/reproduction on/from the MD 101, it is necessary to read out management information recorded on the MD 101, that is, a P-TOC (pre-mastered TOC) and a U-TOC (user TOC). The system controller 111 decides an address of an area for recording on the MD 101 or an address of an area for reproduction in response to such management information as just mentioned. The management information is stored into the buffer memory 113. Consequently, the buffer memory 113 has a storage area divisionally set to a buffer area for storing recording data/reproduction data upon recording/reproduction and another area for retaining the P-TOC and the U-TOC. Then, when the MD 101 is loaded, the system controller 111 controls the pertaining components to execute reproduction on the innermost circumference side of the MD 101 on which the management information is recorded and store the management information into the buffer memory 113 so that the management information can be referred to upon later recording/reproduction on/from the MD 101.

While the U-TOC is edited and rewritten in response to recording or erasure of data, and every time recording/erasure on/from the MD 101 is performed, the system controller 111 performs the editing operation for the U-TOC information stored in the buffer memory 113. Then, in response to the rewriting action, the system controller 111 rewrites also the U-TOC area on the MD 101 at a predetermined timing.

Here, a U-TOC section is described in which management information used for management such as recording and/or reproduction of a track on the MD 101 is recorded. It is to be noted that, not only U-TOC information, but also P-TOC (pre-mastered TOC) information is provided as the TOC information. The P-TOC is formed in a pit area on the innermost circumference side of the MD 101 and is information for reading out only. Then, management of the positions of a recordable area (recordable user area), a lead-out area and a U-TOC area of the disk is performed based on the P-TOC. In a mini disk system, also an optical disk for reproduction only on which all data are recorded in the form of pits can be used. However, the U-TOC is not formed on the disk for reproduction only because also management of tunes recorded as those of a ROM can be performed based on the P-TOC. It is to be noted that, while, in the embodiment described above, the storage medium accommodation apparatus is formed as an apparatus on which both of a CD and an MD are used, the recording media to be accommodated in the storage medium accommodation apparatus of the present invention may include a DVD, a semiconductor storage medium and so forth in addition to a CD and an MD. Thus, the storage medium accommodation apparatus of the present invention is applied widely so as to accommodate a plurality of different recording media.

(6) Action

The storage medium accommodation apparatus of the embodiment described above has such a configuration as described above. Thus, when the storage medium accommodation apparatus is not used for recording and/or reproduction of a CD or an MD, the first panel 3 and the second panel 4 are positioned at the respective first positions and close up the first storage medium access port 2a and the second storage medium access port 2b, respectively, as seen in FIG. 1A. In order to perform, for example, recording/reproduction of an MD in this state, the second panel 4 is moved from the first position to the second position (in the direction indicated by the arrow mark a) to open the second storage medium access port 2b as seen in FIG. 1B.

When an MD 101 is inserted to a predetermined position through the second storage medium access port 2b, then the MD 101 is loaded into the housing 2 and chucked to the spindle motor 131. After the MD 101 is chucked, the second panel 4 is moved to the first position to close up the second storage medium access port 2b as seen in FIG. 1A. Then, recording/reproduction of the MD 101 is performed. After the recording/reproduction of the MD 101 comes to an end, the second panel 4 is moved from the first position to the second position again to open the second storage medium access port 2b. Then, the MD 101 is unloaded. If the MD 101 is pulled off from the second storage medium access port 2b, then the second panel 4 is moved to the first position again to close up the second storage medium access port 2b.

In order to perform reproduction of a CD in the state illustrated in FIG. 1A, the first panel 3 and the second panel 4 are integrally moved simultaneously from the respective first positions to the respective second positions to open the first storage medium access port 2a as seen in FIG. 1C.

If a CD 130 is inserted to a predetermined position through the first storage medium access port 2a, then it is loaded into the housing 2 and chucked to the spindle motor 131. After the CD 130 is chucked, the first panel 3 and the second panel 4 are moved to the respective first positions to close up the first storage medium access port 2a as seen in FIG. 1A. Then, reproduction of the CD 130 is performed. After the reproduction of the CD 130 comes to an end, the first panel 3 and the second panel 4 are moved from the respective first positions to the respective second positions to open the first storage medium access port 2a so that the CD 130 is unloaded. If the CD 130 is taken off the second storage medium access port 2b, then the second panel 4 is moved to the first position again to close up the second storage medium access port 2b.

(7) Other Embodiments

In the basic embodiment described above, even when reproduction of a CD 130 is performed continuously after recording/reproduction of an MD 101 comes to an end, the second storage medium access port 2b shown in FIG. 1B is opened to take out the MD 101 first, and then the second panel 4 is moved to the first position to close up the second storage medium access port 2b as seen in FIG. 1A, whereafter the first storage medium access port 2a is opened as seen in FIG. 1C. However, it is otherwise possible to move, in the state illustrated in FIG. 1B, only the first panel 3 to the second position to open the first storage medium access port 2a and close up the second storage medium access port 2b. This configuration can be obtained comparatively readily by such a method that the structure of the cam mechanism 54 is modified, and particularly the shapes of the first cam grooves 63 and the second cam grooves 64 are modified.

Figure 12A:
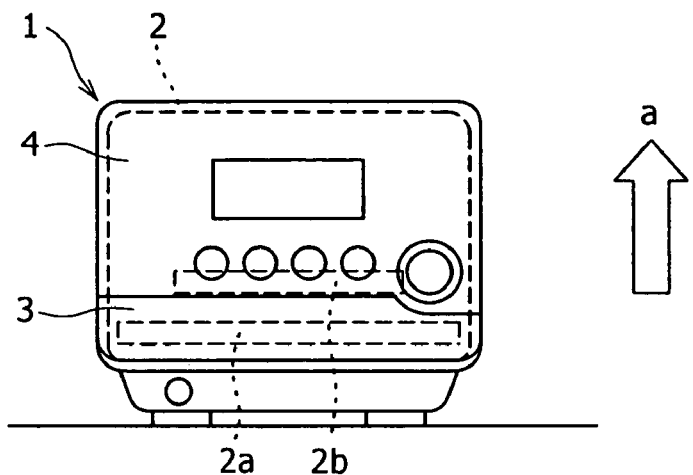
FIGS. 12A, 12B and 12C are front elevational views of another storage medium accommodation apparatus to which the present invention is applied where first and second recording medium access ports are closed up, the second recording medium access port is open and the first recording medium access port is open, respectively.
Figure 12B:
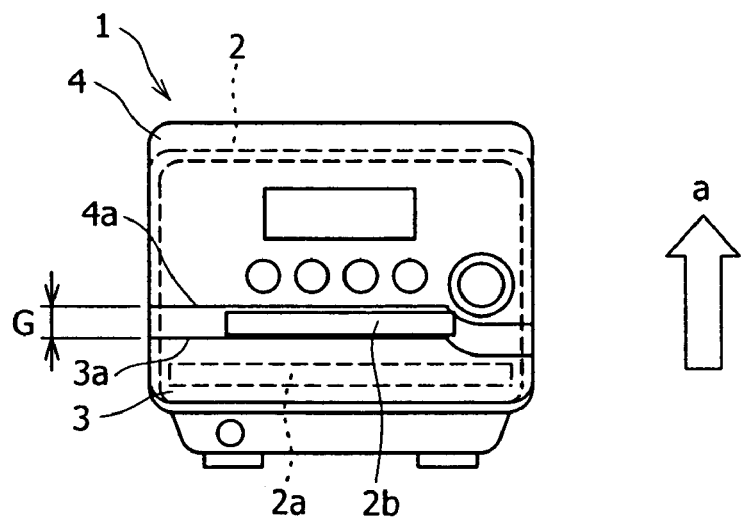
Figure 12C:
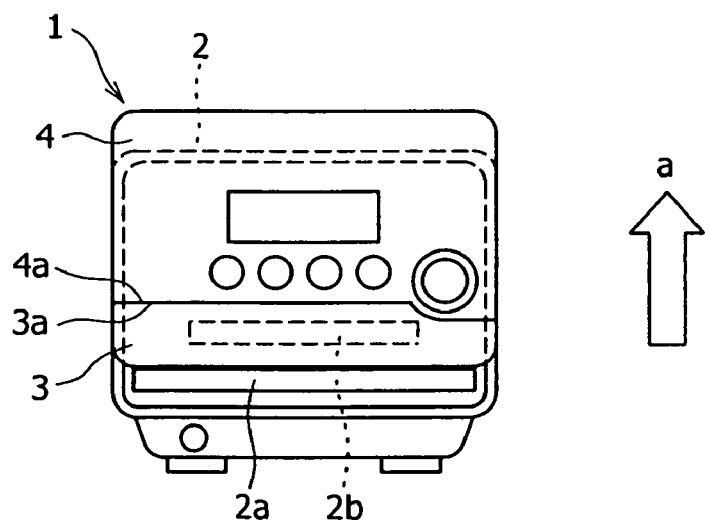

FIGS. 12A to 12C show a second embodiment of the present invention. The storage medium accommodation apparatus of the present embodiment is similar in configuration and operation to that of the basic embodiment described above except such differences as described below, and description of such common components and configurations is omitted herein to avoid redundancy. In particular, the storage medium accommodation apparatus of the present embodiment is different from that of the basic embodiment principally in the locations of the first and second storage medium access ports 2a and 2b and the shapes of the first and second panels 3 and 4. In the storage medium accommodation apparatus of the basic embodiment, the first storage medium access port 2a is formed along a lower end edge of the principal face part 22b of the housing 2 while the second storage medium access port 2b is provided at a substantially central portion of the principal face part 22b, and the first panel 3 is formed substantially in the same size as the second panel 4. On the other hand, in the second embodiment, the both of the first and second storage medium access ports 2a and 2b are provided at a lower half portion of the principal face part 22b of the housing 2. Further, the first and second panels 3 and 4 are divided between the first storage medium access port 2a and the second storage medium access port 2b such that the first panel 3 is formed with a comparatively small area while the second panel 4 is formed with a comparatively great area. With the configuration just described, even where the locations of the first and second storage medium access ports 2a and 2b are changed from those in the basic embodiment, the first and second storage medium access ports 2a and 2b can be opened and closed by substantially same amounts of movement of the first and second panels 3 and 4 as those in the basic embodiment.

Figure 13A:
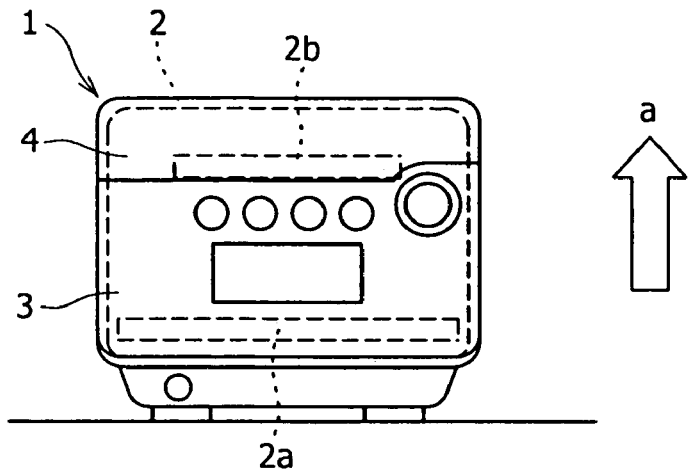
FIGS. 13A, 13B and 13C are front elevational views of a further storage medium accommodation apparatus to which the present invention is applied where first and second recording medium access ports are closed up, the second recording medium access port is open and the first recording medium access port is open, respectively.
Figure 13B:
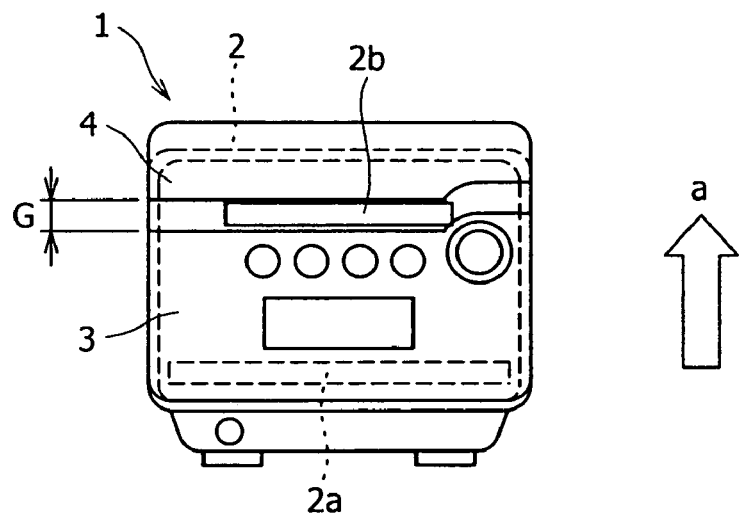
Figure 13C:
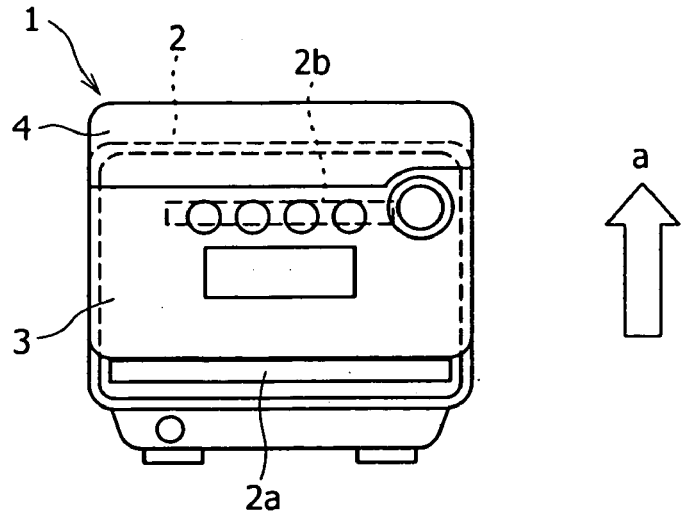

FIGS. 13A to 13C show a third embodiment of the present invention. Also the storage medium accommodation apparatus of the present embodiment is similar in configuration and operation to that of the basic embodiment, and overlapping description of the common configuration and operation is omitted herein to avoid redundancy. The storage medium accommodation apparatus of the present embodiment is different from that of the basic embodiment in that the first storage medium access port 2a is provided at a lower end portion of the principal face part 22b of the housing 2 and the second storage medium access port 2b is provided at an upper end portion of the principal face part 22b of the housing 2. Further, the first and second panels 3 and 4 are divided in the proximity of a lower edge of the second storage medium access port 2b such that the first panel 3 has a comparatively great area while the second panel 4 has a comparatively small area. With the configuration just described, the first and second storage medium access ports 2a and 2b can be opened and closed by substantially same amounts of movement of the first and second panels 3 and 4 as those in the basic embodiment.

Figure 14A:
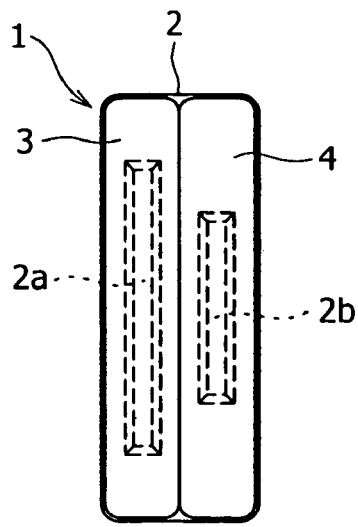
FIGS. 14A, 14B and 14C are front elevational views of a still further storage medium accommodation apparatus to which the present invention is applied where first and second recording medium access ports are closed up, the second recording medium access port is open and the first recording medium access port is open, respectively.
Figure 14B:
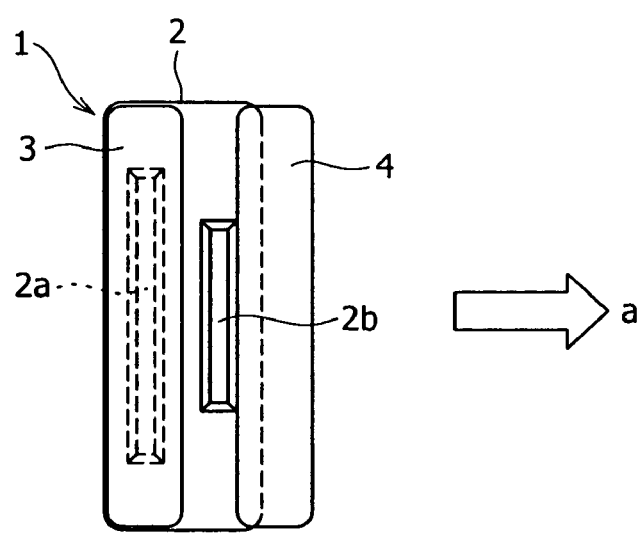
Figure 14C:
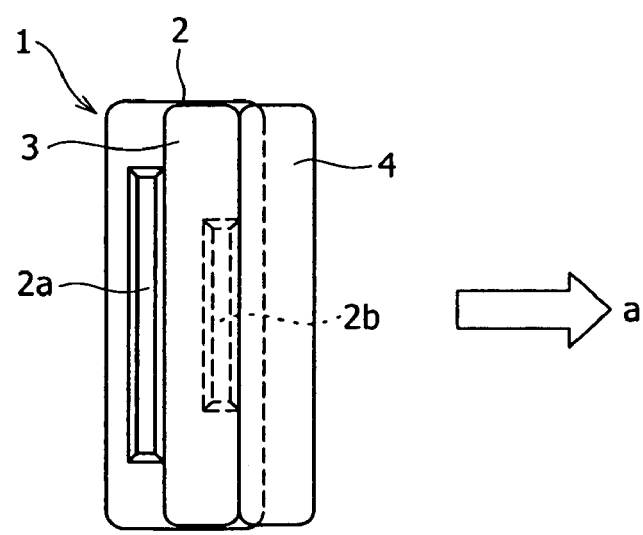
Figure 15:
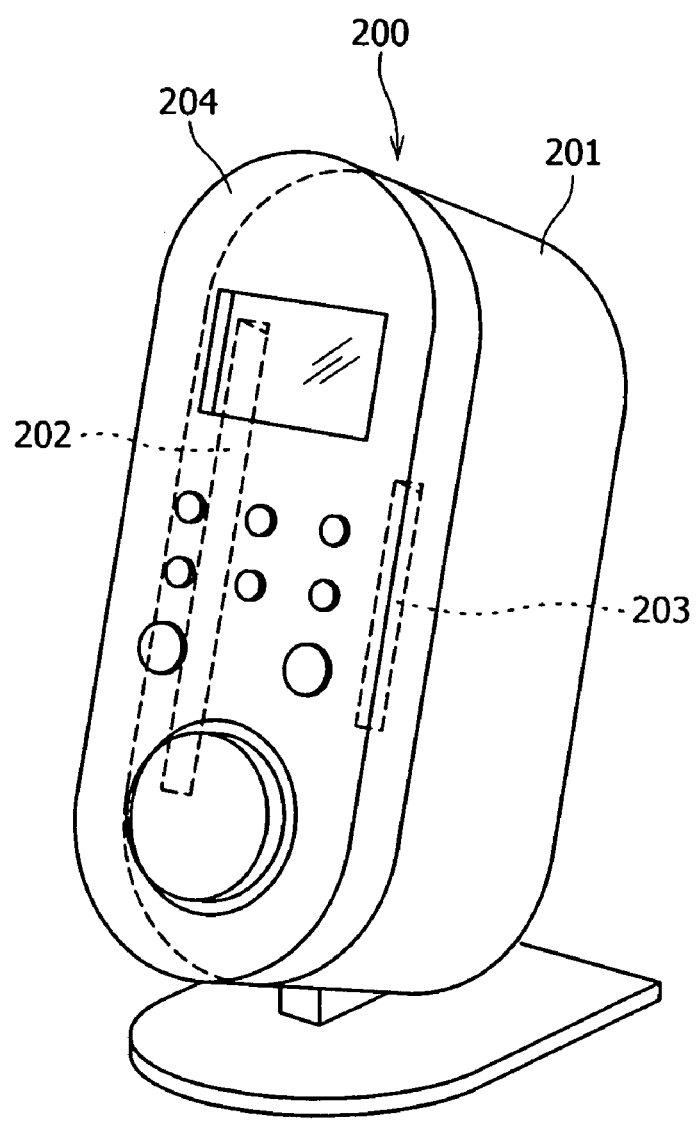
FIG. 15 is a perspective view showing a conventional storage medium accommodation apparatus.
Figure 16A:
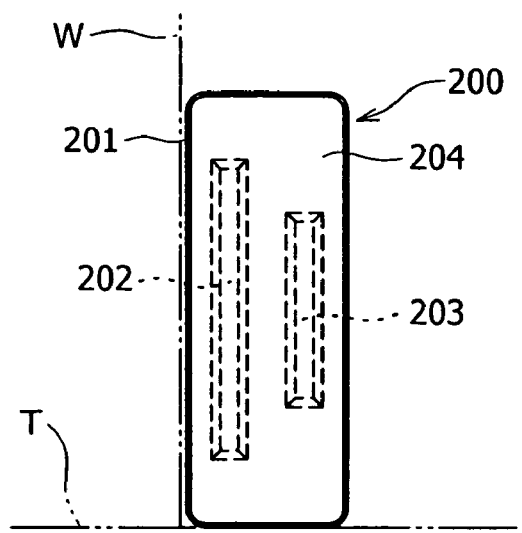
FIGS. 16A, 16B and 16C are front elevational views of the storage medium accommodation apparatus of FIG. 15 where first and second recording medium access ports are closed up, the second recording medium access port is open and the first recording medium access port is open, respectively.
Figure 16B:
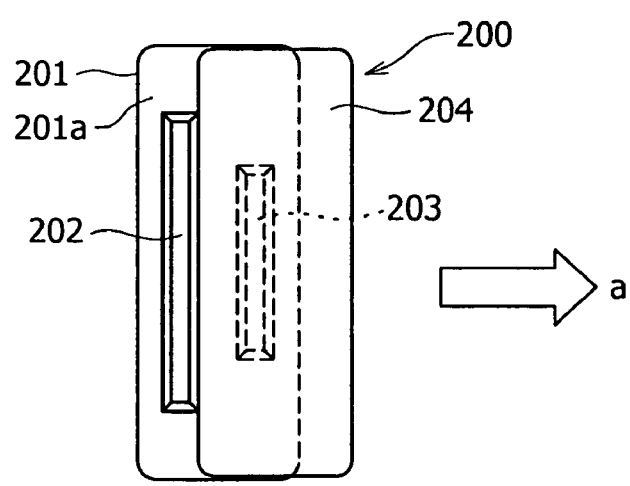
Figure 16C:
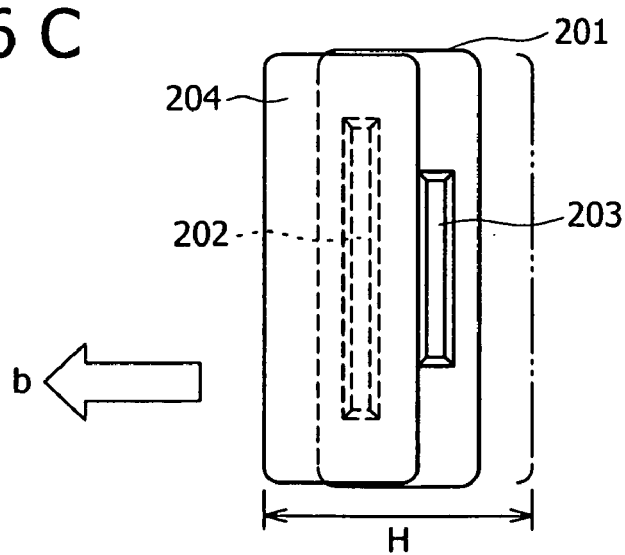
Figure 17A:
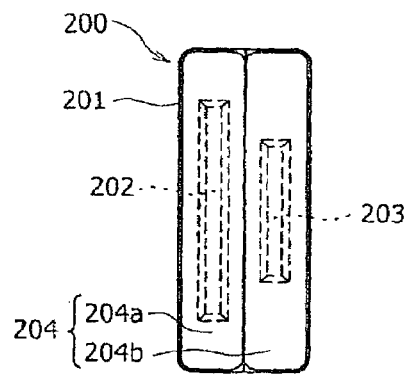
FIGS. 17A, 17B and 17C are front elevational views of another conventional storage medium accommodation apparatus where first and second recording medium access ports are closed up, the second recording medium access port is open and the first recording medium access port is open, respectively.
Figure 17B:
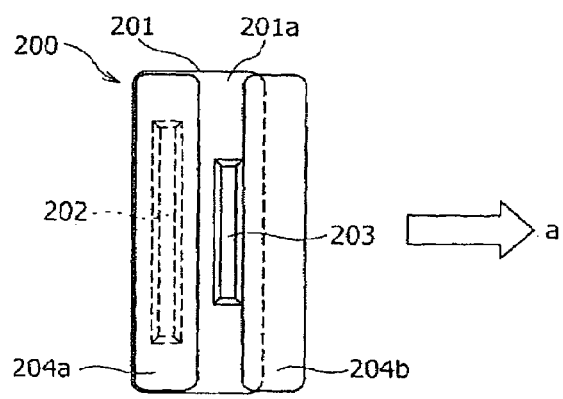
Figure 17C:
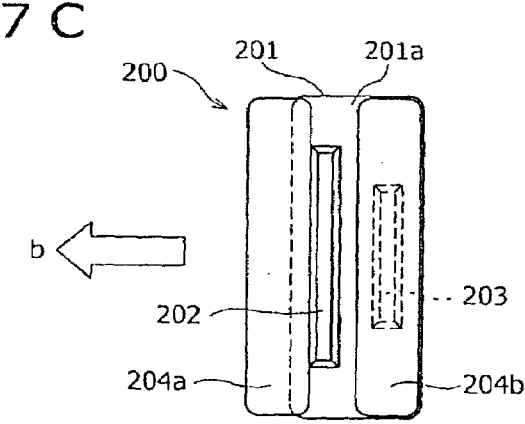

FIGS. 14A to 14C show a fourth embodiment of the present invention. Also the storage medium accommodation apparatus of the present embodiment is similar in configuration and operation to that of the basic embodiment, and overlapping description of the common configuration and operation is omitted herein to avoid redundancy. The storage medium accommodation apparatus of the present embodiment is different from that of the basic embodiment in that it is formed as that of the vertically installed type and the principal face part 22b of the housing 2 and first and second storage medium access ports 2a and 2b are disposed in a vertically elongated configuration. Accordingly, the first and second panels 3 and 4 are moved in a direction perpendicular to the first and second storage medium access ports 2a and 2b to open and close the first and second storage medium access ports 2a and 2b. In short, the configuration of the storage medium accommodation apparatus of the present embodiment is obtained basically by converting the configuration of the basic embodiment into that for vertical installation.

It is to be noted that, while, in the embodiments described above, the first panel and the second panel, when they are positioned at the respective first positions, are positioned closely to each other without leaving a gap therebetween, the first an second panels, when they are at the respective first positions, may otherwise have a gap left therebetween.

While preferred embodiments of the present invention have been described using specific terms, such description is for illustrative purpose only, and it is to be understood that changes and variations may be made without departing from the spirit or scope of the following claims.

What is claimed is:

1. A recording medium accommodation apparatus, comprising:
    a housing having a first storage medium access port and a second storage medium access port provided on a principal face thereof such that a first storage medium and a second storage medium can be inserted into said housing through said first storage medium access port and said second storage medium access port, respectively;
    a first panel attached to the principal face of said housing for movement between a first position at which said first panel closes up said first storage medium access port and a second position at which said first panel opens said first storage medium access port;
    a second panel attached to the principal face of said housing for movement between a first position at which said second panel closes up said second storage medium access port and a second position at which said second panel opens said second storage medium access port; and
    panel driving means for moving said first panel and said second panel,
    said first panel and said second panel being moved in the same direction upon movement thereof from the respective first positions to the respective second positions.

2. The storage medium accommodation apparatus according to claim 1, wherein said first panel and said second panel are arranged in the direction of said movement.

3. The storage medium accommodation apparatus according to claim 2, wherein, when said first panel and said second panel are positioned at the respective first positions, said first panel and said second panel are positioned closely to each other without a gap left therebetween, but when said second panel moves to the second position while said first panel remains at the first position, a gap of a size equal to the amount of movement of said second panel is produced between said first panel and said second panel, said second storage medium access port is exposed.

4. The storage medium accommodation apparatus according to claim 3, wherein said second panel moves to the second position when said first panel moves to the second position.

5. The storage medium accommodation apparatus according to claim 3, wherein said first panel closes up said second storage medium access port when said first panel moves to the second position.

6. The storage medium accommodation apparatus according to claim 2, wherein said first panel moves from the first position to the second position integrally with said second panel.

7. The storage medium accommodation apparatus according to claim 1, further comprising recording and/or reproduction apparatus for performing recording and/or reproduction of the first storage medium and the second storage medium inserted through said first storage medium access port and said second storage medium access port, respectively.

8. The storage medium accommodation apparatus according to claim 1, wherein said first storage medium access port is provided at a lower portion of the principal face of said housing, and said second storage medium access port is provided at a central portion of the principal face of said housing.

9. The storage medium accommodation apparatus according to claim 1, wherein, when said first panel is positioned at the first position, said first panel covers a lower half portion of the principal face of said housing from an edge portion of said first storage medium access port to an edge portion of said second storage medium access port, and when said second panel is positioned at the first position, said second panel covers an upper half portion of the principal face of said housing from an edge portion of said second storage medium access port to an edge portion of the principal face of said housing.

10. The storage medium accommodation apparatus according to claim 1, wherein at least one of said first panel and said second panel has a display section and an operation unit provided thereon.

11. The storage medium accommodation apparatus according to claim 1, wherein said panel driving section includes a motor, a slider for being moved back and forth by said motor, and a cam mechanism for moving said slider in one direction from a neutral position to move said second panel from the first position to the second position, moving said slider back to the original neutral position to move said second panel from the second position back to the first position, moving said slider in the other direction from the neutral position to move said first panel and said second panel from the respective first positions to the respective second positions, and moving said slider back to the original neutral position to move said first panel and said second panel from the respective second positions back to the respective first positions.

* * * * *

UNITED STATES PATENT AND TRADEMARK OFFICE
CERTIFICATE OF CORRECTION

PATENT NO. : 7,343,608 B2 Page 1 of 1
APPLICATION NO. : 11/191725
DATED : March 11, 2008
INVENTOR(S) : Naohiro Nishimoto It is certified that error appears in the above-identified patent and that said Letters Patent is hereby corrected as shown below:

<u>Title Page,</u>

Item (75) Inventor:

Change "Naohiro NOSHIMOTO" to --Naohiro NISHIMOTO--.

Signed and Sealed this

Fifth Day of August, 2008

JON W. DUDAS
*Director of the United States Patent and Trademark Office*